United States Patent [19]

Atkins

[11] Patent Number: 5,363,878

[45] Date of Patent: Nov. 15, 1994

[54] RELIEF VALVE

[75] Inventor: David S. Atkins, Broederstroom, South Africa

[73] Assignee: Zarina Holdings C.V., Amsterdam, Netherlands

[21] Appl. No.: 106,366

[22] Filed: Aug. 13, 1993

[30] Foreign Application Priority Data

Aug. 18, 1992 [ZA] South Africa ............... 92/6206
Jul. 6, 1993 [ZA] South Africa ............... 93/4832

[51] Int. Cl.⁵ ............................................. F16K 15/14
[52] U.S. Cl. ................................. 137/526; 137/859
[58] Field of Search ............... 137/217, 526, 859; 15/1.7

[56] References Cited

U.S. PATENT DOCUMENTS

| 208,379 | 9/1878 | Downey | 137/859 X |
| 2,174,743 | 10/1939 | Groeniger | 137/217 |
| 2,347,988 | 5/1944 | Burke | 137/526 |
| 2,600,731 | 6/1952 | Carlton et al. | |
| 2,606,032 | 8/1952 | Warren | |
| 2,631,049 | 3/1953 | McGillis et al. | |
| 2,962,314 | 11/1960 | Rickard | 137/217 X |
| 4,726,390 | 2/1988 | Franklin | |
| 5,033,504 | 7/1991 | Kallenbach | 137/526 X |

FOREIGN PATENT DOCUMENTS

WO86/04399 7/1986 WIPO .

Primary Examiner—Robert G. Nilson
Attorney, Agent, or Firm—Kilpatrick & Cody

[57] ABSTRACT

This invention concerns a relief valve for use in a swimming pool cleaner hose and has a body with an outlet for connection into the nose. A tubular inlet to the body carries a spider supporting a clamping flange which secures the outer periphery of a resilient annular diaphragm to the end of the body. The diaphragm has its inner periphery in frictional engagement with the inlet. The inlet may be mounted for axial movement against a resilient bias to engage the diaphragm only while a predetermined minimum flow passes through the valve.

5 Claims, 2 Drawing Sheets

5,363,878

RELIEF VALVE

FIELD OF THE INVENTION

This invention relates to a relief valve for liquids and more particularly to a valve which may conveniently be used with domestic swimming pool filtration equipment.

BACKGROUND OF THE INVENTION

Today many domestic swimming pools have automatic cleaners which operate through the suction provided by the pool filtration pump. Water entraining debris and other dirt is sucked from the submerged surfaces of the pool through the cleaner to a filtration unit and returned, clean, to the pool.

The cleaners referred to operate best at a certain flow rate and to maintain this flow rate a relief valve is usually included in the cleaner apparatus and has a marked effect on the operation of the cleaner.

One problem with known type of relief valves used for the purpose above set out further is that they are often either blocked or held too widely open by debris entrapped therein. A second problem which often occurs is that on starting of the filtration equipment the pump induces a flow which is insufficient to cause the machine to work but does induce flow through the relief valve.

It is the object of the present invention to provide a simple relief valve which will at least mitigate the above disadvantages.

SUMMARY OF THE INVENTION

According to this invention there is provided a relief valve for connection in a liquid flow line comprising a body having an inlet in the form of a tube opening into the body and an outlet and an annular flexible diaphragm with its outer periphery secured to the wall of the body and its inner periphery aligned for friction engagement around the inlet.

Further features of this invention provide for the diaphragm to be flexible into the body only and for its inner periphery to be held in a preloaded condition around a fixed inlet and for the tubular inlet to taper inwardly inside the body from the area of engagement of the diaphragm.

The invention also provides the inlet to be supported for axial movement in the body against a resilient bias and disengaged from the diaphragm when there is no flow through the valve and for the inlet to be adapted for connection into a flexible suction hose.

BRIEF DESCRIPTION OF THE DRAWINGS

A preferred embodiment of this invention is described below with reference to the accompanying drawings which show in.

DETAILED DESCRIPTION OF THE INVENTION WITH REFERENCE TO THE DRAWINGS

Figure 1:
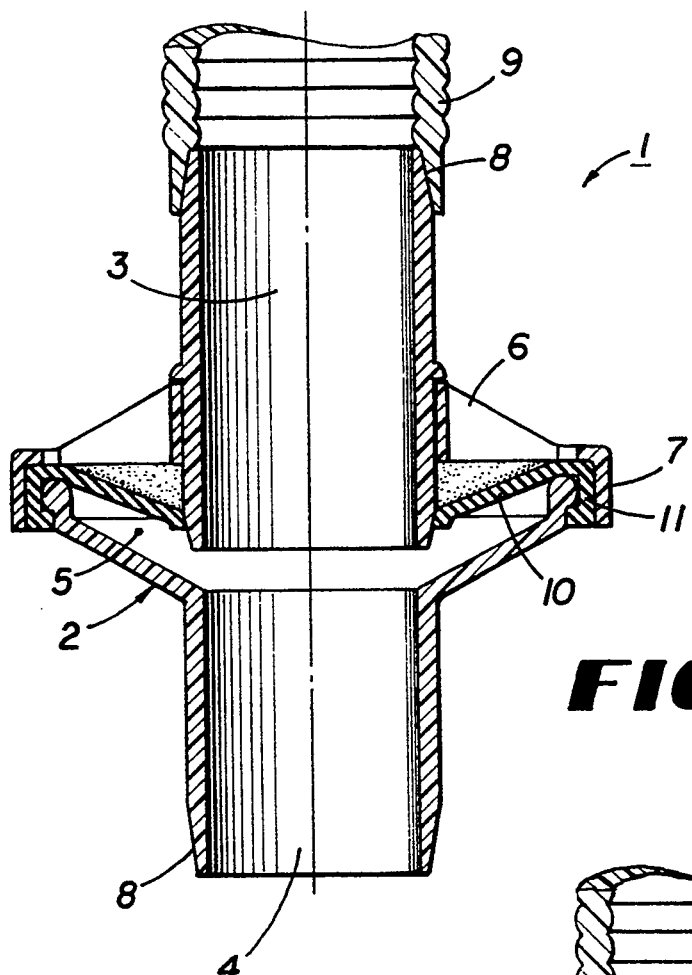
FIG. 1 a longitudinal cross-sectional view through the valve.

In the embodiment of FIG. 1 the relief valve (1) is particularly suitable for connection into the flexible hose of an automatic swimming pool cleaner. It will preferably be located in the swimming pool weir so that the relief flow through the valve can provide a surface skimming effect to remove floating particles from the surface of the water.

The valve (1) consists of a body (2) having an inlet (3) in the form of a tube opening into the body and an outlet (4).

The inlet forms with the end of the body (2) adjacent thereto an annular space (5). The tubular inlet (3) carries a suitable spider (6), preferably with only three legs, supporting a clamping flange (7). This gives a flow area with minimum restriction.

The outer ends (8) of the inlet and the outlet which extends from the body are shaped as male components for connection into the usual form of flexible hose (9) used with swimming pools of this kind and the weir outlet for such pools.

As will be seen from the drawing the body (2) of the valve (1) has a stepped configuration.

Between the inlet (3) and the adjacent end of the body is located a resilient diaphragm (10) spanning the annular space (5). The diaphragm (10) has a turned over outer periphery (11) which locates over the outer end of the body (2) where it is held in place by the forced engagement of the clamping flange as shown.

The diaphragm (10) is secured around its outer periphery (11) to the body (2) and its inner periphery is in resilient engagement with the tubular inlet (3). This engagement is under a predetermined pre-loading which is provided by making the internal diameter of the diaphragm (10) smaller than the outer diameter of the inlet (3).

It will be appreciated that, in use, when the pressure in the body is reduced below a predetermined amount the edge of the diaphragm (10) will flex inwardly into the body providing an annular opening for the flow of relief water by-passing the swimming pool cleaner into the suction hose.

Because of the preloading of the diaphragm the relief valve cannot open unless there is a predetermined flow through the valve and this flow will be chosen to be sufficient to bring the swimming pool cleaner into operation.

The tubular inlet (3) is tapered inwardly inside the body as illustrated and this has a positive effect on the operation of the valve. Under high flow conditions the valve will provide greater relief than would be the case if the tubular inlet (3) was not tapered inwardly from the normal area of contact between the diaphragm (10) and the tubular inlet (3).

The annular space between the diaphragm and the inlet when the valve is operating is very unlikely to be blocked by any debris which may pass into the flexible hose.

Figure 2:
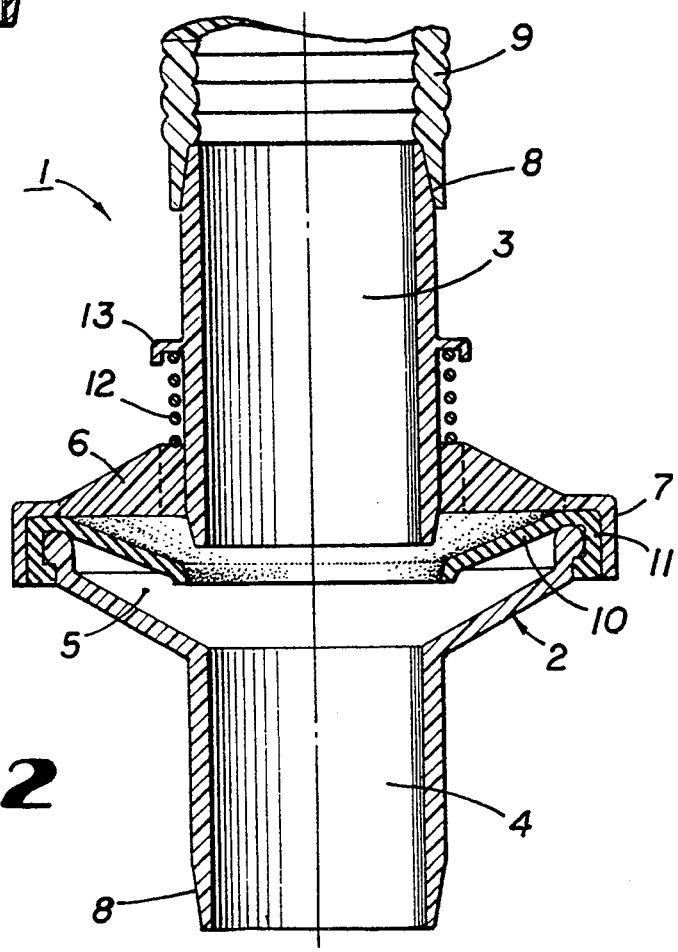
FIG. 2 a similar view through an alternative embodiment.

An alternative embodiment is illustrated in FIG. 2 of the drawings. In this form the inlet (3) is slidably mounted in the spider (6). A resilient bias shown as a compression spring (12) is located between the spider (6) and a suitable positioned stop (13) on the inlet. Any other suitable resilient bias may be used.

In the condition of no flow through the valve illustrated the inlet is aligned with but not engaged by the diaphragm. This construction has the advantage that debris which may have come to rest on the diaphragm (10) when there is no flow through the valve will be drawn through the valve as an initial reduced pressure is applied to the valve. Further reduction in pressure will cause the inlet (3) to move against the compression spring (12) and engage in the diaphragm (10) whereafter the valve will operate as above described.

It will be understood that the preloading of the assembled diaphragm will be caused by the shape to which it is moulded and the inner periphery may include a bead to prevent any tendency towards tearing while the concave shape of the assembled diaphragm will also be ensured when it is moulded.

Figure 3:
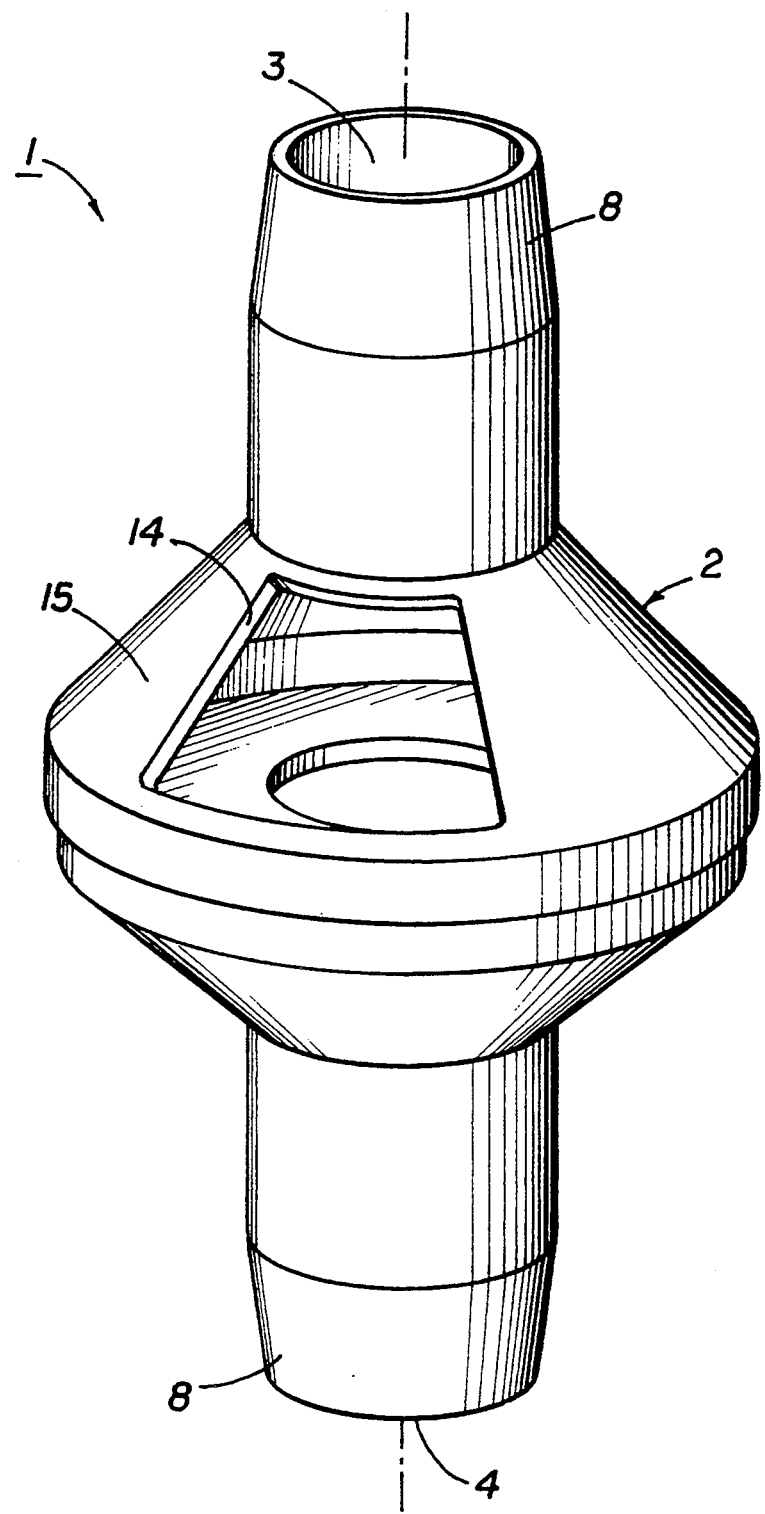
FIG. 3 a perspective view of another alternative embodiment.

FIG. 3 illustrates another alternative embodiment of valve (1) of the present invention. As shown in FIG. 3, body (2), which encloses spider (6), includes an opening (14) in its generally conical portion (15). Opening (14) typically has an area of at least twelve square centimeters, although it may be larger or smaller as necessary or desired. Incorporating opening (14) reduces vortex generation, enabling valve (1) to be horizontally mounted to enjoy the maximum depth of water in a weir. Alternatively, if in vertical configuration weir, opening (14) assists valve (1) in functioning regardless of whether inlet (3) forms the inlet of valve (1) or valve (1) is rotated 180° and outlet (4) used as the inlet. In other words, embodiments consistent with FIG. 3 can be used with fluid flowing either through inlet (3) to outlet (4) or through outlet (4) to inlet (3).

The material from which the diaphragm is moulded will be chosen from suitable plastics material. The best material for particular circumstances of use will be readily determined by those skilled in the art.

What is claimed is:

1. A relief valve for connection in a liquid flow line comprising a body having an inlet in the form of a tube opening into the body and an outlet and an annular flexible diaphragm with its outer periphery secured to the wall of the body and its inner periphery aligned for frictional engagement around the inlet, and in which the diaphragm is flexible into the body only and the inlet is supported for axial movement in the body against a resilient bias and disengaged from the diaphragm when there is no flow through the valve.

2. A relief valve for connection in a liquid flow line, comprising:
 a. a body defining:
  i. a tubular inlet opening into the body and having an outer diameter and a stop;
  ii. an outlet; and
  iii. a wall;
 b. an annular flexible diaphragm defining:
  i. an inner periphery positioned for frictional engagement with the tubular inlet;
  ii. an outer periphery secured to the wall of the body; and
  iii. an internal diameter smaller than the outer diameter of the tubular inlet; and
 c. a spider supporting a clamping flange for securing the outer periphery of the annular flexible diaphragm to the wall of the body; and
 d. means, comprising a compression spring circumscribing the outer diameter of the tubular inlet between the spider and the stop, for permitting the tubular inlet to move to engage the inner periphery of the annular flexible diaphragm.

3. A relief valve according to claim 2 in which the body further defines a conical segment having an opening for reducing vortex generation when the relief valve is in use.

4. A relief value having an inlet and an outlet and for connection in a liquid flow line, comprising a body having a tube and an annular flexible diaphragm with its outer periphery secured to the wall of the body and its inner periphery aligned for frictional engagement around the tube, and in which the tube is supported for axial movement in the body against a resilient bias and disengaged from the diaphragm when there is no flow through the valve.

5. A relief valve for connection in a liquid flow line comprising a body having an inlet in the form of a tube opening into the body and an outlet and an annular flexible diaphragm with its outer periphery secured to the wall of the body and its inner periphery aligned for frictional engagement around the inlet, which diaphragm is flexible into the body only and which inlet tapers inwardly inside the body from the area of normal engagement of the diaphragm, carries a spider supporting a clamping flange to secure the outer periphery of the diaphragm to the end of the body, and is adapted for connection into a flexible suction hose.

* * * * *